US012785318B2

(12) United States Patent
Chen et al.

(10) Patent No.: US 12,785,318 B2
(45) Date of Patent: Nov. 3, 2026

(54) BRACKET AND TERMINAL EQUIPMENT

(71) Applicant: Wistron NeWeb Corporation, Hsinchu (TW)

(72) Inventors: Yuan-Yu Chen, Hsinchu (TW); Ming-Hung Hung, Hsinchu (TW); Ying Chih Liu, Hsinchu (TW)

(73) Assignee: WISTRON NEWEB CORPORATION, Hsinchu (TW)

(*) Notice: Subject to any disclaimer, the term of this patent is extended or adjusted under 35 U.S.C. 154(b) by 381 days.

(21) Appl. No.: 18/481,355

(22) Filed: Oct. 5, 2023

(65) Prior Publication Data

US 2024/0120679 A1 Apr. 11, 2024

(30) Foreign Application Priority Data

Oct. 7, 2022 (TW) .................................. 111138314

(51) Int. Cl.
*H01R 13/50* (2006.01)
*H01R 13/502* (2006.01)
*H01R 13/506* (2006.01)

(52) U.S. Cl.
CPC ....... *H01R 13/5025* (2013.01); *H01R 13/506* (2013.01)

(58) Field of Classification Search
CPC ..... H01R 13/5025; H01R 13/506; H01Q 1/12
USPC ................................ 248/200, 300, 560–635
See application file for complete search history.

(56) References Cited

U.S. PATENT DOCUMENTS 7,455,271 B2 * 11/2008 Pincek ................... F16M 13/02 248/220.21
7,992,673 B2 * 8/2011 Petrie ....................... H04R 1/02 181/150
8,020,821 B2 * 9/2011 Chen ...................... F16M 13/02 248/221.11
8,453,983 B2 * 6/2013 Huang ................... F16M 11/22 248/222.12
9,016,641 B1 * 4/2015 Kauffman .............. F16M 13/02 248/200
9,346,414 B1 * 5/2016 Kuhens ............... B60R 11/0258
9,404,615 B1 * 8/2016 Gonzalez ............. H05K 5/0208
(Continued)

FOREIGN PATENT DOCUMENTS

CN 108006938 A 5/2018
CN 108915365 A 11/2018
(Continued)

*Primary Examiner* — Muhammad Ijaz
(74) *Attorney, Agent, or Firm* — McClure, Qualey & Rodack, LLP

(57) ABSTRACT

A bracket and a terminal equipment are provided. The bracket is provided for a terminal device to be installed thereon and includes a bracket body, two installing elements, and at least one holding element. The two installing elements respectively protrude outward from two sides of the bracket body, and each of the two installing elements includes an engaging portion. The two installing elements are configured to be inserted into the terminal device so the terminal device is installed on the bracket, and each of the engaging portions is configured such that each of the installing elements is engaged with and retained in the terminal device. The holding element protrudes outward from the bracket body and is configured to be inserted into a loading hole of the terminal device.

20 Claims, 8 Drawing Sheets

100

(56) References Cited

U.S. PATENT DOCUMENTS

| | | | | |
|---|---|---|---|---|
| 9,602,902 | B2 * | 3/2017 | Kieltyka | H04R 1/025 |
| 9,976,692 | B1 * | 5/2018 | Nicolas | H04R 1/026 |
| 9,982,832 | B1 * | 5/2018 | Nicolas | F16M 11/2014 |
| D841,624 | S * | 2/2019 | Nicolas | D14/209 |
| 10,330,240 | B1 * | 6/2019 | Cho | H04Q 1/06 |
| 11,339,802 | B1 * | 5/2022 | Fan | F04D 29/005 |
| 11,353,782 | B2 * | 6/2022 | Södergård | G08B 13/19632 |
| 12,021,294 | B2 * | 6/2024 | Yoo | H01Q 1/1228 |
| 12,035,088 | B2 * | 7/2024 | Corten | H04R 1/026 |
| 12,426,174 | B2 * | 9/2025 | Ramones | H02G 3/20 |
| 2007/0075202 | A1 * | 4/2007 | Gordon | H04R 1/026<br>248/292.12 |
| 2008/0031486 | A1 * | 2/2008 | Petrie | H04R 1/02<br>381/390 |
| 2008/0105803 | A1 * | 5/2008 | Tu | H05K 5/0204<br>248/220.22 |
| 2011/0146163 | A1 * | 6/2011 | Naroditsky | H05K 5/0204<br>52/27 |
| 2013/0240690 | A1 * | 9/2013 | Florman | F21V 21/00<br>29/700 |
| 2015/0277491 | A1 * | 10/2015 | Browning | G06F 1/1632<br>248/346.03 |
| 2015/0280307 | A1 * | 10/2015 | Lin | H01Q 1/1264<br>248/230.5 |
| 2017/0188123 | A1 * | 6/2017 | Wright | F16M 11/16 |
| 2020/0186901 | A1 * | 6/2020 | Brousseau | F16M 13/02 |
| 2022/0136528 | A1 * | 5/2022 | Fan | F04D 29/601<br>248/200 |
| 2024/0121920 | A1 * | 4/2024 | Chen | G06F 1/1656 |
| 2024/0179441 | A1 * | 5/2024 | Dixon | H04R 1/026 |
| 2024/0230019 | A1 * | 7/2024 | Yang | H01Q 1/1228 |
| 2025/0055184 | A1 * | 2/2025 | Stewart | H01Q 1/246 |

FOREIGN PATENT DOCUMENTS

| | | | |
|---|---|---|---|
| CN | 213239226 | U | 5/2021 |
| CN | 113357489 | A | 9/2021 |
| JP | H07246106 | A | 9/1995 |

* cited by examiner

BRACKET AND TERMINAL EQUIPMENT

CROSS-REFERENCE TO RELATED PATENT APPLICATION

This application claims the benefit of priority to Taiwan Patent Application No. 111138314, filed on Oct. 7, 2022. The entire content of the above identified application is incorporated herein by reference.

BACKGROUND

Technical Field

The present disclosure relates to a bracket and a terminal equipment, and more particularly, to a bracket for installing a terminal device and a terminal equipment having the bracket and the terminal device.

Description of Related Art

With the advancement of technology, the demand for internet access increases and so is the pursuit of internet quality. In response to the demand, customer premises equipment (CPE) capable of receiving 5G signals is developed based on 5G communication technology to act as a terminal device for signal reception. To ensure the stability of signal reception, the user needs to check signal strength through their mobile phones first to determine the location where the terminal device should be installed. However, the installation of conventional terminal devices, be it installed indoor or outdoor, requires the user to mount the terminal device on the bracket with two hands, which means the user needs to check the signal with the mobile phone first and then put the mobile phone down to take the terminal device, and therefore it is inconvenient to operate. In addition, the design of conventional brackets blocks the bottom of the terminal device, which obstructs the airflow surrounding the terminal device in vertical direction, thereby causing a low heat dissipation efficiency of the terminal device.

In view of this, a bracket and a terminal equipment that are easy to operate are the goals to be achieved by the related industry.

SUMMARY

It is an object of the present disclosure to provide a bracket for installing a terminal device. The bracket includes a bracket body, two installing elements, and at least one holding element. The two installing elements respectively protrude outward from two sides of the bracket body and are configured to be inserted into the terminal device to install the terminal device on the bracket. Each of the two installing elements includes an engaging portion configured to engage each of the two installing elements with the terminal device. The at least one holding element protrudes outward from the bracket body and is configured to be inserted into at least one loading hole of the terminal device.

It is another object of the present disclosure to provide a terminal equipment with a terminal device and a bracket. The terminal device includes an installation plane, at least one loading hole, and two engaging components. The at least one loading hole is disposed on the installation plane, and the two engaging components are respectively disposed at two sides of the installation plane. The bracket includes a bracket body, two installing elements, and at least one holding element. The two installing elements are respectively disposed at two sides of the bracket body and detachably engaged with the two engaging components. The at least one holding element protrudes outward from the bracket body and is detachably inserted into the at least one loading hole. When the terminal device is installed on the bracket, each of the two engaging components are engaged with each of the two installing elements, and the at least one holding element is inserted into the at least one loading hole, such that the at least one holding element supports the terminal device along a direction perpendicular to a protruding direction of the at least one holding element.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
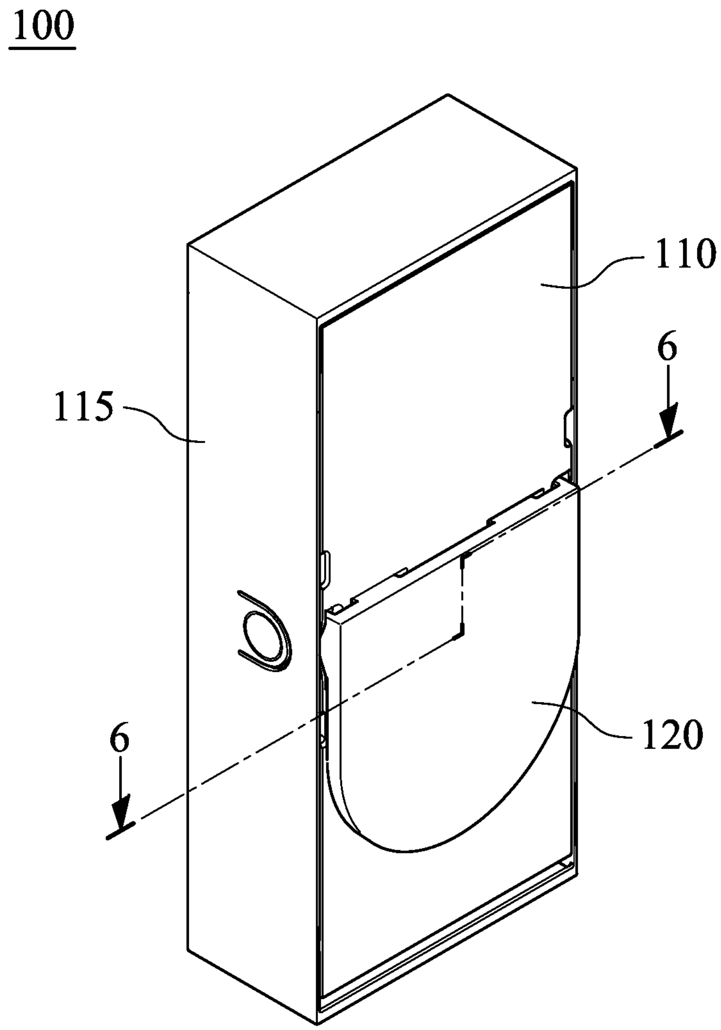
FIG. 1 is a schematic perspective view of a terminal equipment according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
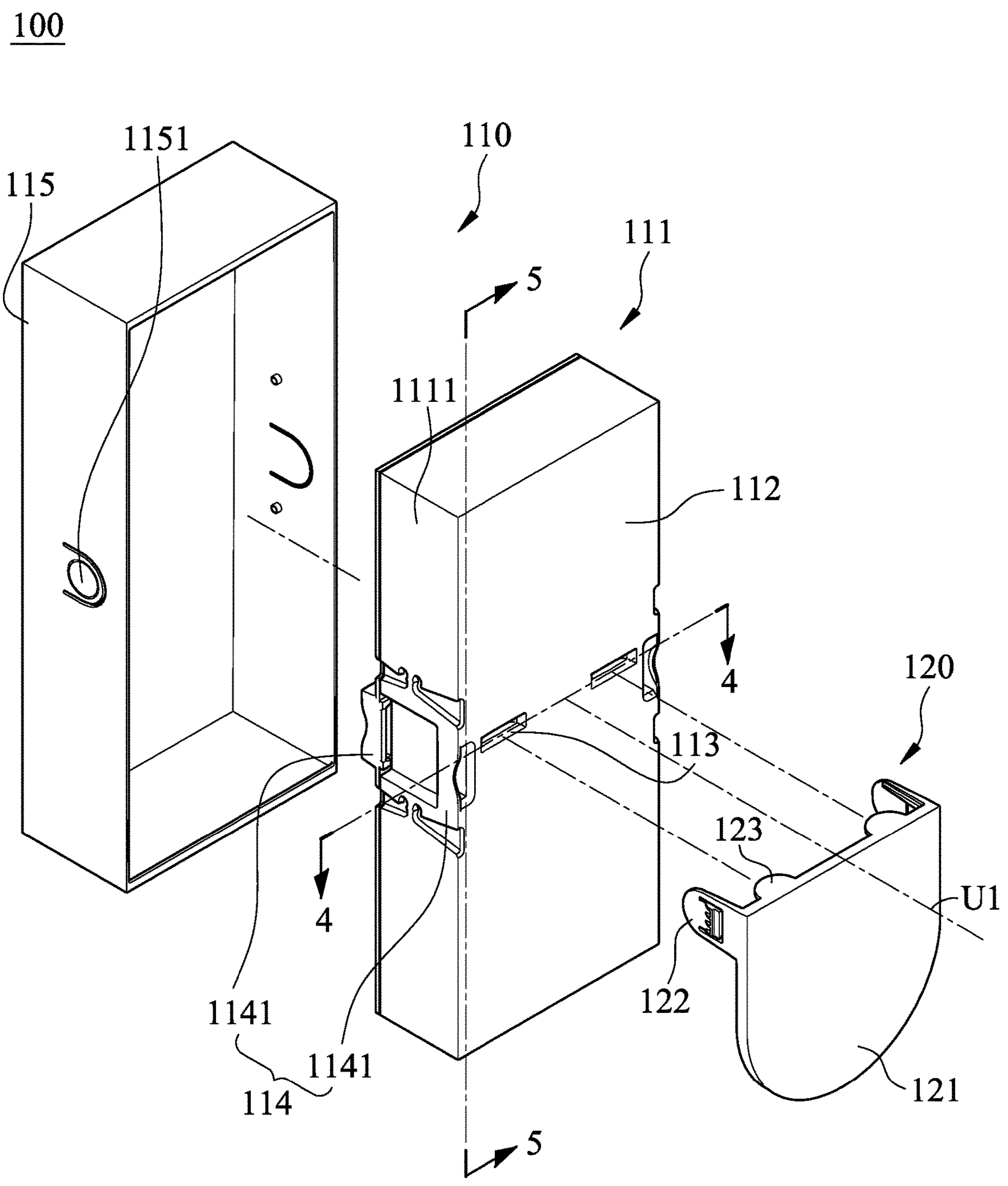
FIG. 2 is a schematic exploded view of the terminal equipment in FIG. 1.

Referring to FIG. 1 and FIG. 2, which are respectively a schematic perspective view and a schematic exploded view of a terminal equipment 100 according to an embodiment of the present disclosure, the terminal equipment 100 includes a terminal device 110 and a bracket 120. The terminal device 110 includes an installation plane 112, at least one loading hole 113, and two engaging components 114. The loading hole 113 is disposed on the installation plane 112. The two engaging components 114 are respectively located at two sides of the installation plane 112. The bracket 120 includes a bracket body 121, two installing elements 122, and at least one holding element 123. The two installing elements 122 are respectively disposed at two sides of the bracket body 121, and each installing element 122 can be detachably engaged with each engaging component 114. The holding element 123 extends and protrudes outward from the bracket body 121 and can be detachably inserted into the loading hole 113. When the terminal device 110 is installed on the bracket 120, each engaging component 114 is engaged with each installing element 122, and the holding element 123 is inserted into the loading hole 113, so that the holding element 123 supports the terminal device 110 along a direction perpendicular to a protruding direction of the holding element 123.

In specific, the two installing elements 122 respectively extend and protrude outward from two sides of the bracket body 121. The installing elements 122 and the holding element 123 protrude outward from the bracket body 121 in the same direction, and the direction is parallel to an axis U1. The protruding direction of the installing elements 122 and the holding element 123 faces the installation plane 112 of the terminal device 110. Through the configuration of the engaging components 114 and the loading hole 113, the user can hold the terminal device 110 by the engaging components 114 at the two sides with single hand and engage each engaging component 114 with each installing element 122 along the axis U1 to install the terminal device 110 on the bracket 120, and the holding element 123 stably supports the terminal device 110. Hence, the conventional way of installing the terminal device on the bracket with both hands is eliminated, and the detachment process is improved. As such, the convenience in operating the terminal device 110 is enhanced. Moreover, the low heat dissipation efficiency issue caused by obstruction from the conventional terminal device installed to the bracket at its bottom side is avoided. Through disposing the engaging components 114 at two sides of the terminal device 110, the internal space of the terminal device is spared, and the design freedom of the terminal device 110 is increased.

In particular, the terminal device 110 further includes a terminal device body 111 and a cover 115. The terminal device body 111 has two side planes 1111. The installation plane 112 is connected to the two side planes 1111, and the two engaging components 114 are respectively disposed on the two side planes 1111. The cover 115 covers the terminal device body 111, and the installation plane 112 is exposed from the cover 115. In other embodiments, the engaging components can be disposed inside the side walls of the cover so that the user can install the terminal device directly onto the bracket through the cover, but the present disclosure is not limited thereby.

Figure 3:
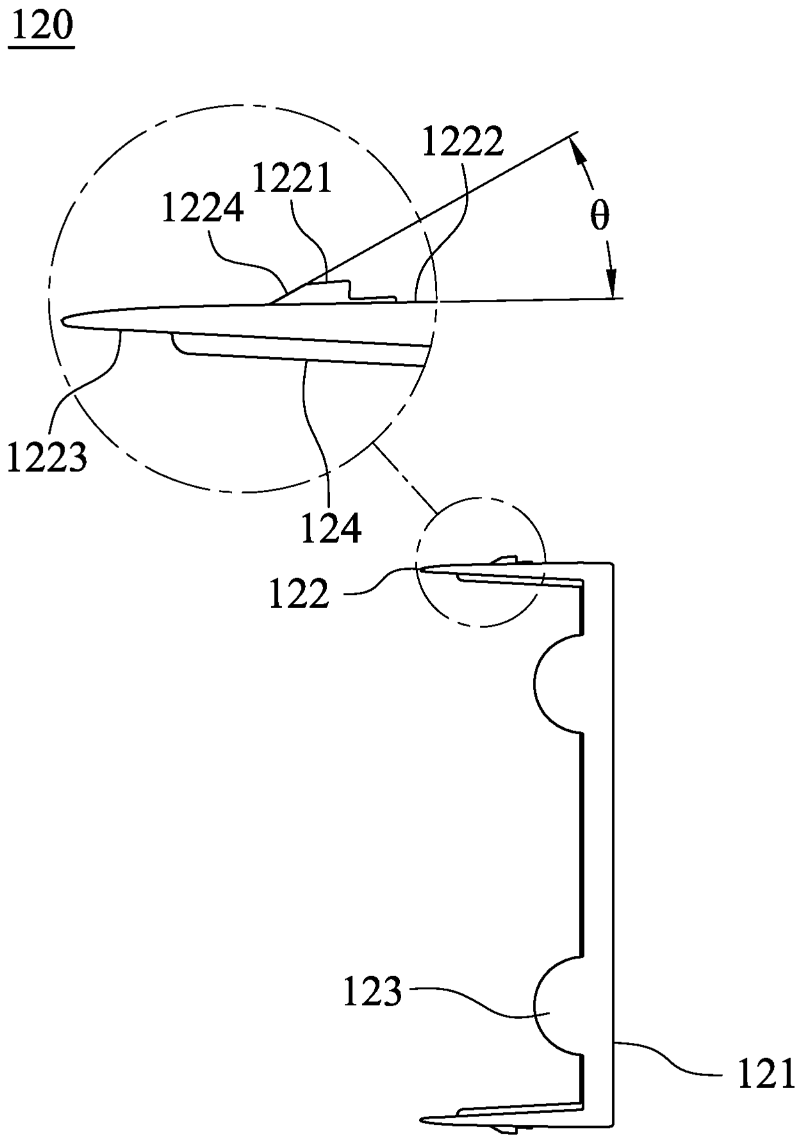
FIG. 3 is a schematic top view of a bracket in FIG. 1.
Figure 4:
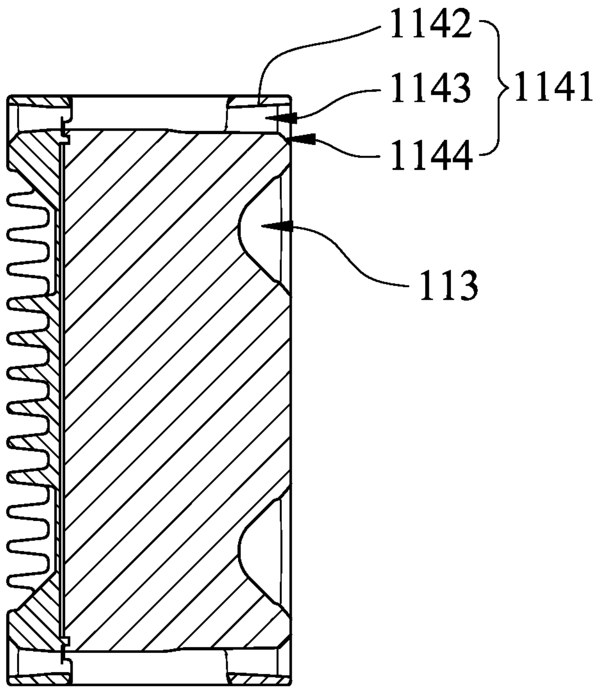
FIG. 4 is a schematic cross-sectional view of a terminal device in FIG. 2 taken along line 4-4.
Figure 5:
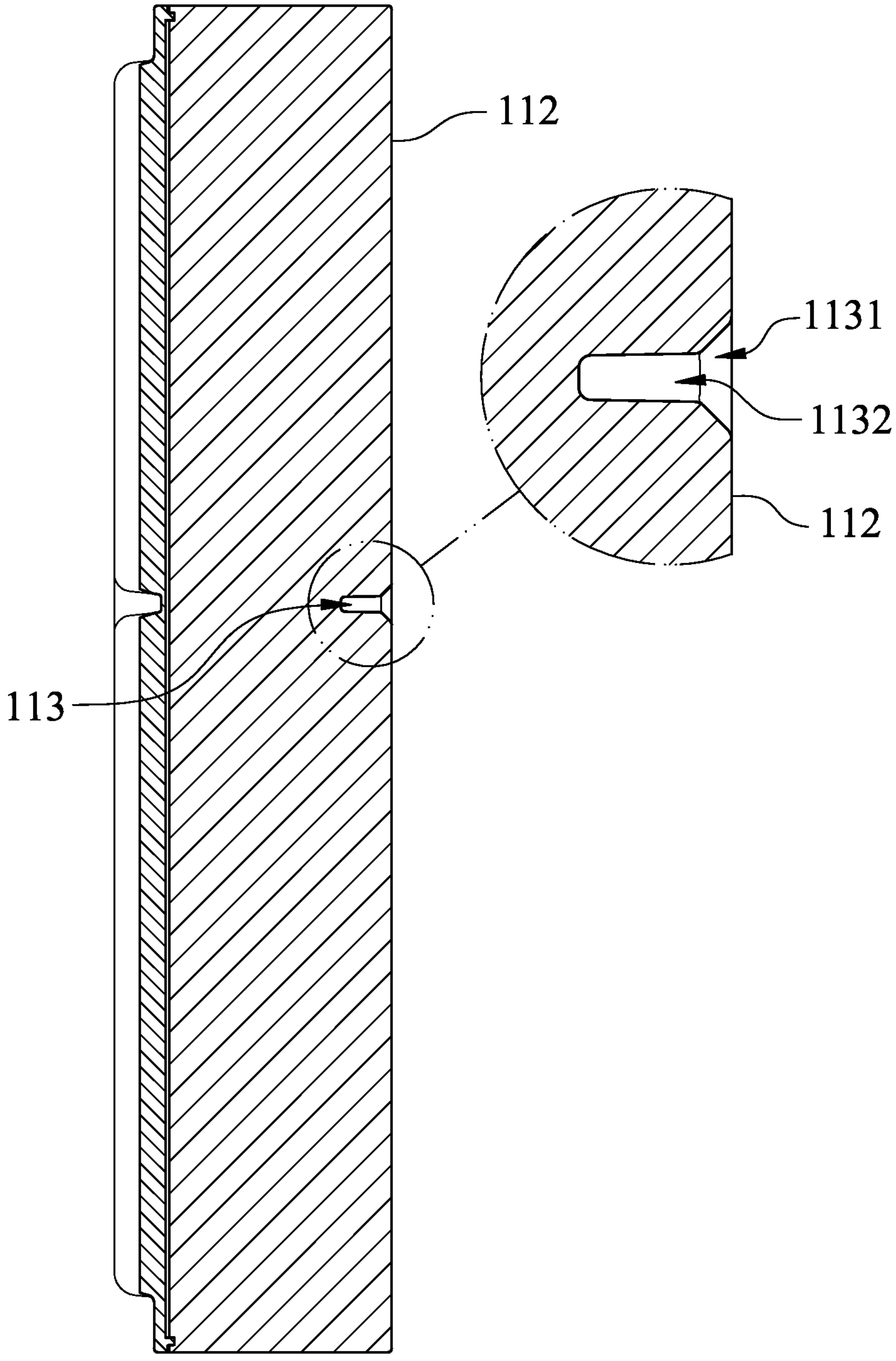
FIG. 5 is a schematic cross-sectional view of the terminal device in FIG. 2 taken along line 5-5.

Referring to FIG. 3 to FIG. 5, which respectively are a schematic top view of the bracket 120 in FIG. 1, a schematic cross-sectional view of the terminal device 110 in FIG. 2 taken along line 4-4, and a schematic cross-sectional view of the terminal device 110 in FIG. 2 taken along line 5-5, each engaging component 114 includes an engaging slot 1141 configured to accommodate each installing element 122. Each installing element 122 has a board structure and protrudes outward. Each installing element 122 also has an engaging portion 1221 disposed on an external surface 1222 of each installing element 122 and protruding therefrom. When the terminal device 110 is installed onto the bracket 120 along the axis U1, each installing element 122 enters each engaging slot 1141, and each engaging portion 1221 is compressed under a force and passes through the slot wall 1142 of each engaging slot 1141 to be accommodated in each engaging slot 1141, so that each engaging portion 1221 abuts against the slot wall 1142 of each engaging slot 1141. Specifically, the user can hold the two sides of the terminal device 110 with one single hand and move the terminal device 110 along the axis U1 to approach near the bracket 120 so that the installing elements 122 are engaged respectively with the engaging slots 1141 under the force by interference and the engaging portions 1221 are respectively accommodated in the engaging slots 1141 and abut against the slot wall 1142 of the engaging slots 1141. Furthermore, when the user would like to detach the terminal device 110 from the bracket 120, the user can press the two engaging portions 1221 and move the terminal device 110 away from the bracket 120 along the axis U1, and the engaging portions 1221 are compressed under the force and pass through the slot wall 1142 of the respectively engaging slots 1141 so that the terminal device 110 is detached from the bracket 120. Thus, the efficiency of detaching the terminal device 110 is improved.

More specifically, the holding element 123 has a board structure in a semi-circle shape. One end of each installing element 122 is arc-shaped and the aforementioned end is away from the bracket body 121. As such, when the terminal device 110 is installed onto the bracket 120 along the axis U1, the rounded shapes help to guide the engagement of each engaging slot 1141 and each installing element 122 and guide the insertion of the holding element 123 into the loading hole 113. Furthermore, each engaging portion 1221 has an inclined surface 1224. An angle θ is contained between each inclined surface 1224 and the external surface 1222 of each installing element 122, and a distance between each inclined surface 1224 and each external surface 1222 increases toward the bracket body 121. Through the configuration of the engaging portion 1221 having the inclined surface 1224, the engaging portion 1221 passes through the engaging slot 1141 more smoothly when compressed under the force, and so that it is beneficial to the assembly or disassembly of the installing element 122 to or from the engaging slot 1141.

As shown in FIG. 3, each installing element 122 further includes a plurality of enforcement ribs 124 disposed on an internal surface 1223 of each installing element 122 and protruding along the direction where each installing element 122 protrudes, and the structural strength of the installing elements 122 is thereby enforced.

As shown in FIG. 4, each engaging slot 1141 has a guiding slot opening 1143 that is in communication with an engaging space 1144 therein. Each guiding slot opening 1143 tapers toward the engaging space 1144. Thus, the installing element 122 is guided to be engaged in the engaging slot 1141, and when one end of the installing element 122 passes through the engaging slot 1141, the engaging space 1144 accommodates a part of the installing element 122.

As shown in FIG. 4 and FIG. 5, a number of the holding element 123 is two. The two holding elements 123 are arranged to be spaced apart, and the loading holes 113 are arranged to correspond in position to the holding elements 123. Each loading hole 113 includes a guiding opening 1131. The guiding opening 1131 is in communication with a holding space 1132 in the loading hole 113 and tapers toward the holding space 1132.

Referring to FIG. 2, a number of engaging slot 1141 of each engaging component 114 is two, and the two engaging slots 1141 respectively locate at two long sides of each side plane 1111. Moreover, a number of the loading hole 113 is four, where two loading holes are located on the installation plane 112 and the other two loading holes are located on the other plane of the terminal device body 111 opposite the installation plane 112. In the embodiment of FIG. 1, the installation plane 112 of the terminal device 110 is located on the other side of the terminal device body 111 opposite to the side where a cooling plate is disposed, but the present disclosure is not limited thereto. More particularly, by disposing the loading holes 113 on the installation plane 112 and the other plane opposite the installation plane 112, the user can remove the cover 115 and put the cover back on the terminal device body 111 such that the other plane opposite the installation plane 112 is exposed from the cover 115 and is used to install the terminal device 110 onto the bracket 120. Hence, the user can install the terminal device 110 with different orientation such as exposing the cooling plate or covering the cooling plate with the cover 115 based on usage requirement like installing the terminal device 110 onto the bracket 120 indoor or outdoor, and so the convenience in usage is enhanced.

Figure 6:
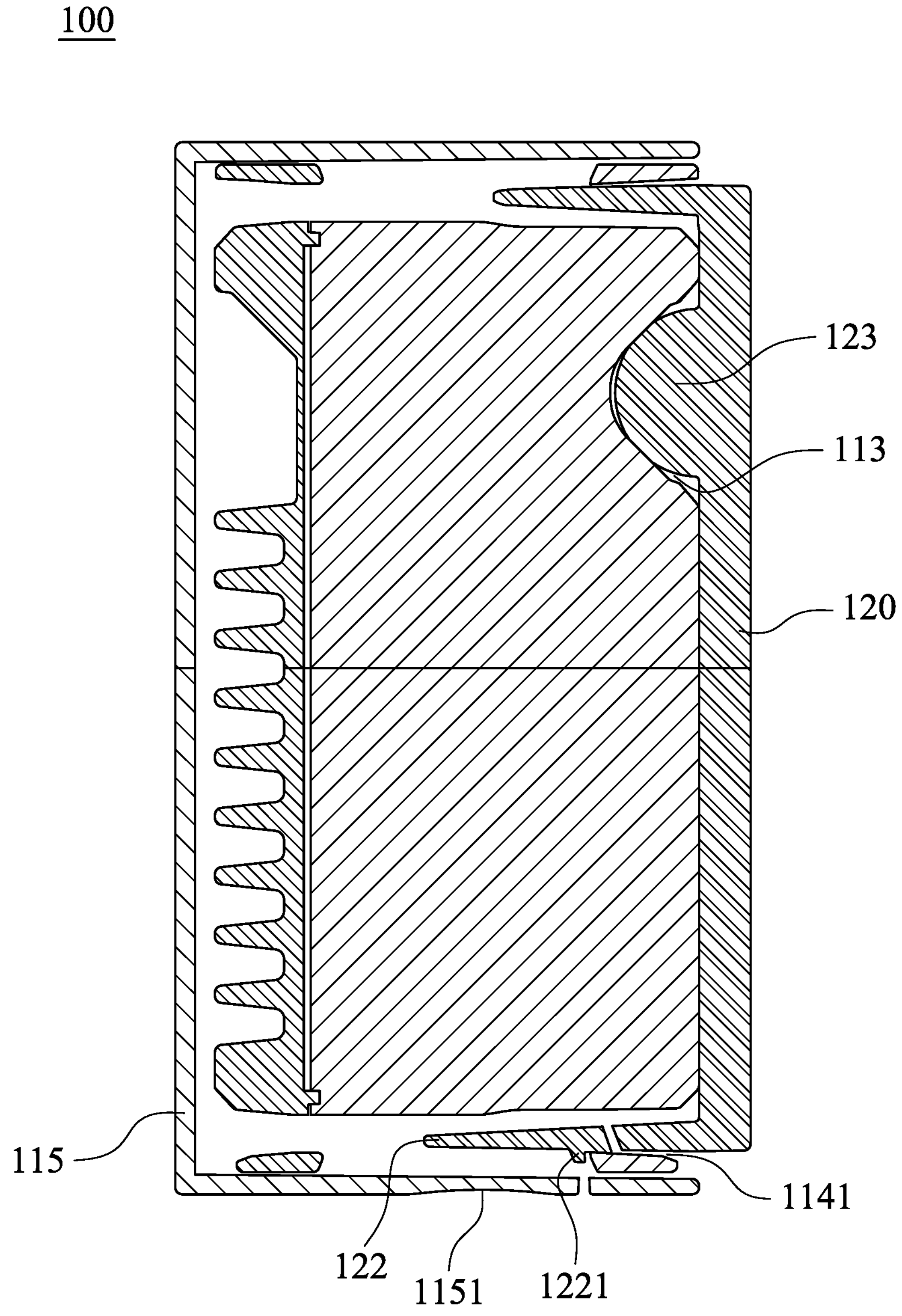
FIG. 6 is a schematic cross-sectional view of the terminal equipment in FIG. 1 taken along line 6-6.

Referring to FIG. 6, which is a schematic cross-sectional view of the terminal equipment 100 in FIG. 1 taken along line 6-6, the cover 115 has two detachment buttons 1151, and each detachment button 1151 is disposed in correspond to each installing element 122. The detachment buttons 1151 respectively correspond in position to the installing elements 122, and one end of each detachment button 1151 corresponds to each engaging portion 1221. When the installing elements 122 are engaged in the engaging slots 1141, the user can push the detachment buttons 1151 on the cover 115 to abut against the engaging portions 1221 so that the engaging portions 1221 are compressed under a force and the installing elements 122 are released from the engaging slots 1141. Then, the terminal device 110 is detached from the bracket 120. The convenience in usage is therefore further enhanced.

Further, the bracket body 121 has a bracket backside configured for fixing to a structural body. In specific, the structural body can be a wall surface, a window, or a vertical surface, and the bracket backside is fixedly attached to the structure body by screw or adhesive, but the present disclosure is not limited thereby.

Figure 7:
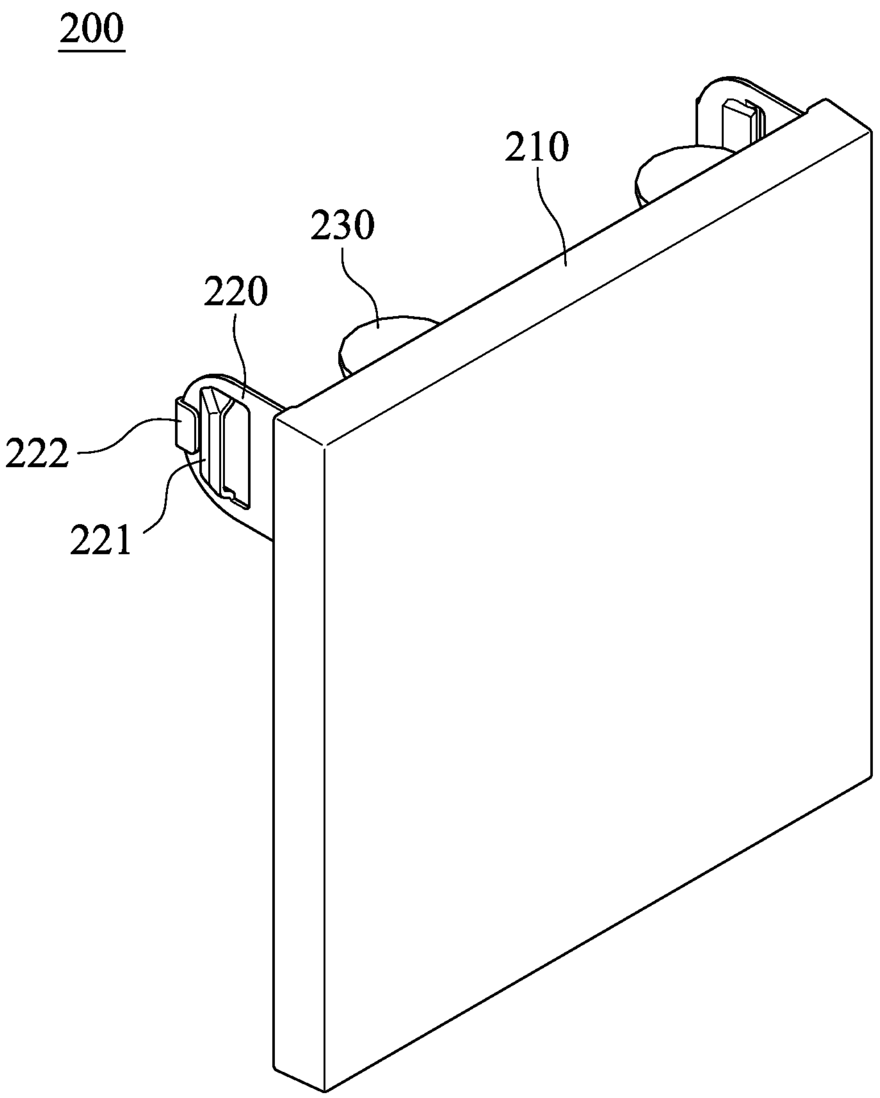
FIG. 7 is a schematic perspective view of a bracket according to another embodiment of the present disclosure.
Figure 8:
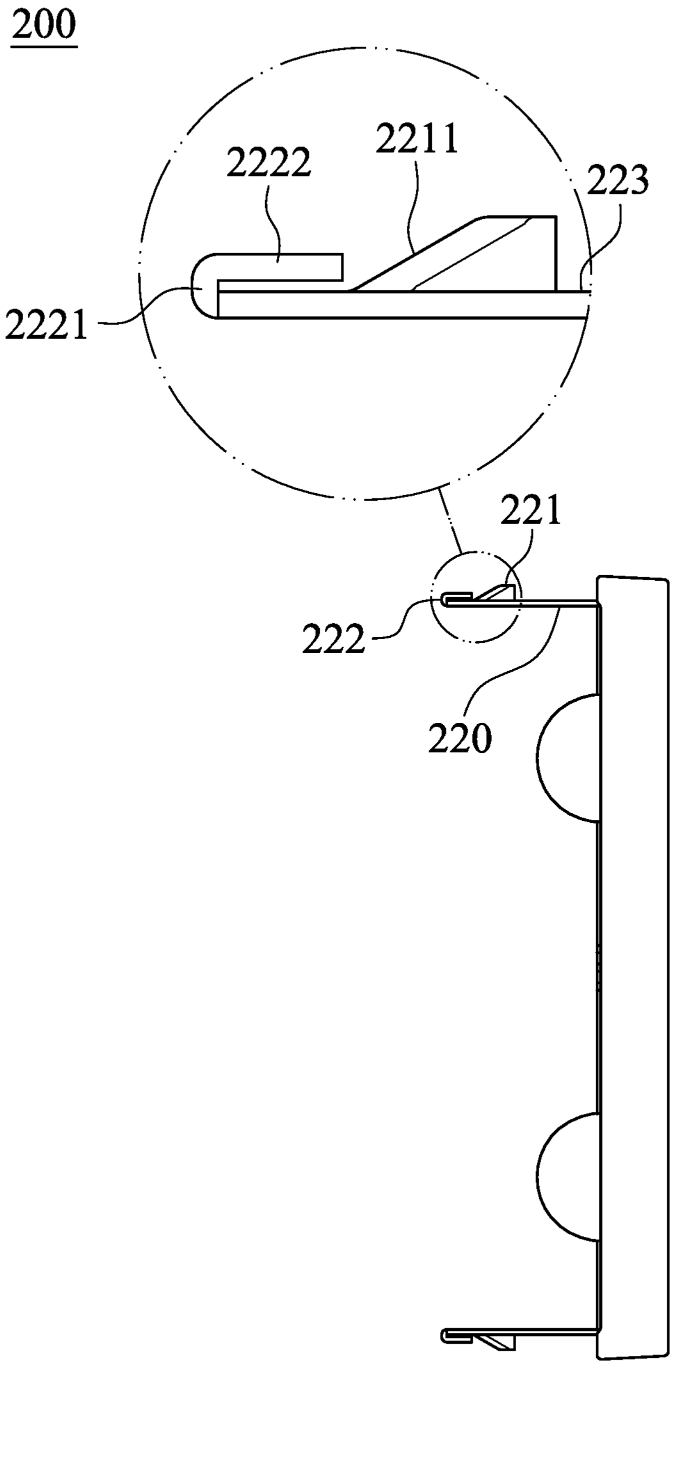
FIG. 8 is a schematic top view of the bracket in FIG. 7.

Referring to FIG. 7 and FIG. 8, which are respectively a schematic perspective view and a schematic top view of a bracket 200 according to another embodiment of the present disclosure, the bracket 200 for installing a terminal device according to another embodiment includes a bracket body 210, two installing elements 220, and at least one holding element 230. The two installing elements 220 respectively protrude outward from two sides of the bracket body 210 and are configured to be inserted into a terminal device so the terminal device is installed onto the bracket 200. Each installing element 220 includes one engaging portion 221 configured to retain and engage each installing element 220 to the terminal device. The holding element 230 protrudes outward from the bracket body 210 and is configured to be inserted into a loading hole of the terminal device. It is to be noted that the terminal device 110 of FIG. 1 can be installed onto the bracket 200 of FIG. 7, and the present disclosure is not limited thereby.

More particularly, each installing element 220 further includes a bend portion 222 that has an arc section 2221 and a linear section 2222. Each arc section 2221 is connected to one end of each installing element 220 that is away from the bracket body 210, and each linear section 2222 is integrally connected to each arc section 2221. Each linear section 2222 and each external surface 223 are separated by a gap. The installing element 220 having the bend portion 222 can further guide the engaging component of the terminal device to engage with the installing element 220.

Furthermore, the bracket body 210, the installing elements 220, and the holding element 230 are made of a metal material. The bracket body 210, the installing elements 220, and the holding element 230 can be formed integrally by a sheet metal material to make up the structure of the bracket 200. The engaging portions 221 can be formed by sheet metal piercing or punching to form the inclined surfaces 2211 of the engaging portions 221.

In view of the above, the present disclosure encompasses the following advantages. First, by disposing the installing elements at two sides of the terminal device, the user is able to install the terminal device with a single hand, and so that the convenience in operating the terminal device is enhanced. Second, through the combination of the engaging slots and the engaging portions, it is easy for the user to take down the terminal device. Third, with the detachment buttons disposed on the cover, it is easy for the user to detach the terminal device from the bracket.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A bracket for installing a terminal device, the bracket comprising:

a bracket body comprising a main surface and two side surfaces, wherein the two side surfaces are connected to the main surface and opposite to each other;

two installing elements respectively protruding outward from the bracket body, each of the two installing elements comprising an engaging portion and an outer surface, wherein for each of the two outer surfaces, the outer surface is flush with a portion of a corresponding one of the two side surfaces, wherein the two installing elements are configured to be inserted into the terminal device such that the terminal device is installed on the bracket, and each of the two engaging portions is configured to engage each of the two installing elements with the terminal device; and at least one holding element protruding outward form the bracket body and configured to be inserted into at least one loading hole of the terminal device.

2. The bracket according to claim 1, wherein each of the two installing elements has a board structure, one end of each of the two installing elements that is away from the bracket body is arc-shaped, and the at least one holding element has a board structure in a semi-circle shape.

3. The bracket according to claim 1, wherein each of the two engaging portions is disposed on and protrudes from an external surface of each of the two installing elements and has an inclined surface, an angle is contained between each of the two inclined surfaces and each of the two external surfaces, and a distance between each of the two inclined surfaces and the external surface of each of the two installing elements increases toward the bracket body.

4. The bracket according to claim 1, wherein each of the two installing elements further comprises a bend portion with an arc section and a linear section integrally connected to the arc section, each of the two arc sections is connected to one end of each of the two installing elements that is away from the bracket body, and each of the two linear sections is separated from an external surface of each of the two installing elements by a gap.

5. The bracket according to claim 1, wherein each of the two installing elements further comprises a plurality of enforcement ribs disposed on an internal surface of each of the two installing elements.

6. The bracket according to claim 1, wherein the bracket body, the two installing elements, and the at least one holding element are made of a metal material.

7. The bracket according to claim 1, wherein a number of the at least one holding element is two, and the two holding elements are disposed to be spaced apart from each other.

8. A terminal equipment comprising:
- a terminal device, comprising:
- an installation plane;
- at least one loading hole disposed on the installation plane; and
- two engaging components respectively disposed at two sides of the installation plane; and
- a bracket, comprising:
- a bracket body;
- two installing elements respectively disposed at two sides of the bracket body, wherein each of the two installing elements is detachably engaged with each of the two engaging components; and
- at least one holding element protruding outward from the bracket body, wherein the at least one holding element is detachably inserted into the at least one loading hole;
- wherein, when the terminal device is installed on the bracket, each of the two engaging components are engaged with each of the two installing elements, and the at least one holding element is inserted into the at least one loading hole so that the at least one holding element supports the terminal device along a direction perpendicular to a protruding direction of the at least one holding element;
- wherein an upper surface of the holding element is flush with an upper surface of the installing element.

9. The terminal equipment according to claim 8, wherein the terminal device further comprises a terminal device body with two side planes, the installation plane is connected to the two side planes, and the two engaging components are respectively disposed at the two side planes.

10. The terminal equipment according to claim 8, wherein each of the two engaging components comprises an engaging slot for accommodating each of the two installing elements, each of the two installing elements protrudes outward and has a board structure and an engaging portion, each of the two engaging portions is disposed on and protrudes from an external surface of each of the two installing elements, when the terminal device is installed on the bracket, each of the two installing elements enters each of the two engaging slots, and each of the two engaging portions is forced to be compressed to pass through a wall of each of the two engaging slots and be accommodated in each of the two engaging slots such that each of the two engaging portions abuts against the wall of each of the two engaging slots.

11. The terminal equipment according to claim 10, wherein each of the two engaging portions has an inclined surface, an angle is contained between each of the two inclined surfaces and the external surface of each of the two installing elements, and a distance between each of the two inclined surfaces and each of the two external surfaces increases toward the bracket body.

12. The terminal equipment according to claim 10, wherein each of the two installing elements further comprises a bend portion with an arc section and a linear section integrally connected to the arc section, each of the two arc sections is connected to one end of each of the two installing elements that is away from the bracket body, and each of the two linear sections is separated from each of the two external surfaces by a gap.

13. The terminal equipment according to claim 10, wherein the bracket body, the two installing elements, and the at least one holding element are made of a metal material.

14. The terminal equipment according to claim 10, wherein each of the two engaging slots comprises a guiding slot opening in communication with an engaging space therein, each of the two guiding slot openings tapers toward each of the two engaging spaces, the at least one loading hole comprises a guiding opening in communication with a holding space therein, and the guiding opening of the at least one loading hole tapers toward the holding space.

15. The terminal equipment according to claim 8, wherein each of the two installing elements has a board structure, one end of each of the two installing elements that is away from the bracket body is arc-shaped, and the at least one holding element has a board structure in a semi-circle shape.

16. The terminal equipment according to claim 8, wherein a number of the at least one holding element is two, and the two holding elements are disposed to be spaced apart.

17. A terminal equipment, comprising:
- a terminal device, comprising:
- an installation plane;
- at least one loading hole disposed on the installation plane; and
- two engaging components respectively disposed at two sides of the installation plane; and
- a bracket, comprising:
- a bracket body;
- two installing elements respectively disposed at two sides of the bracket body, wherein each of the two installing elements is detachably engaged with each of the two engaging components; and
- at least one holding element protruding outward from the bracket body, wherein the at least one holding element is detachably inserted into the at least one loading hole;
- wherein, when the terminal device is installed on the bracket, each of the two engaging components are engaged with each of the two installing elements, and the at least one holding element is inserted into the at least one loading hole so that the at least one holding element supports the terminal device along a direction perpendicular to a protruding direction of the at least one holding element;

wherein the terminal device further comprises a terminal device body and a cover, the terminal device body comprises two side planes, the installation plane is connected to the two side planes, the cover covers the terminal device body, the installation plane is exposed from the cover, the cover comprises two detachment buttons, and each of the two detachment buttons is positioned in correspondence to each of the two installing elements.

18. The terminal equipment according to claim 17, wherein the two engaging components are disposed inside a side wall of the cover.

19. The bracket according to claim 1, wherein an upper surface of the holding element is flush with an upper surface of the installing element.

20. The terminal equipment according to claim 8, wherein the bracket body comprises a bracket backside configured to be fixed to a structural body.

* * * * *